(12) United States Patent
Stevens

(10) Patent No.: US 9,254,748 B2
(45) Date of Patent: Feb. 9, 2016

(54) VEHICLE TRACTION CONTROL

(71) Applicant: HONDATA, INC., Torrance, CA (US)

(72) Inventor: Derek Stevens, Redondo Beach, CA (US)

(73) Assignee: HONDATA, INC., Torrance, CA (US)

( * ) Notice: Subject to any disclaimer, the term of this patent is extended or adjusted under 35 U.S.C. 154(b) by 256 days.

(21) Appl. No.: 13/757,542

(22) Filed: Feb. 1, 2013

(65) Prior Publication Data

US 2014/0222308 A1 Aug. 7, 2014

(51) Int. Cl.
*B60W 30/18* (2012.01)
*B60K 28/16* (2006.01)

(52) U.S. Cl.
CPC ............ *B60K 28/16* (2013.01); *B60W 2720/26* (2013.01)

(58) Field of Classification Search
CPC ... B60T 8/175; B60T 8/1769; B60T 2201/14; B60T 8/172; B60T 8/1755; B60T 8/48; B60T 8/00; B60T 2210/12; B60T 2270/602; B60T 2270/603; B60T 8/17616; B60T 8/4809; B60T 13/586; B60T 13/662; B60W 10/11; B60W 2520/14; B60W 2520/28; B60W 2540/12; B60W 2710/0605; B60W 30/18172; B60W 10/02; B60W 10/08; B60W 20/00; B60W 2520/10; B60W 2720/106; B60W 10/184; B60W 2520/105
USPC ............ 701/22, 50, 74, 87, 91, 108; 180/197, 180/248, 249, 233, 250
See application file for complete search history.

(56) References Cited

U.S. PATENT DOCUMENTS

| | | | | |
|---|---|---|---|---|
| 4,554,990 A * | 11/1985 | Kamiya et al. | ................ | 180/197 |
| 5,168,952 A * | 12/1992 | Oono et al. | ................... | 180/197 |
| 5,270,930 A * | 12/1993 | Ito | ........................ | B60K 17/346 477/35 |
| 5,292,184 A * | 3/1994 | Takata | .................... | B60T 8/173 303/147 |
| 5,407,023 A * | 4/1995 | Yamashita et al. | ............ | 180/197 |
| 5,459,662 A * | 10/1995 | Tezuka et al. | ................... | 701/86 |
| 5,463,551 A * | 10/1995 | Milunas | ......................... | 701/91 |
| 5,473,544 A * | 12/1995 | Yamashita | ...................... | 701/86 |
| 5,504,680 A * | 4/1996 | Yamashita et al. | .............. | 701/90 |
| 5,600,560 A * | 2/1997 | Yamashita et al. | .............. | 701/84 |
| 5,644,488 A * | 7/1997 | Ito et al. | ............................ | 701/1 |
| 5,729,455 A * | 3/1998 | Yamashita et al. | ............ | 303/139 |
| 5,732,380 A * | 3/1998 | Iwata | ..................... | B60K 28/16 123/336 |
| 5,754,966 A * | 5/1998 | Ichikawa | ............... | B62D 7/159 180/410 |
| 5,805,449 A * | 9/1998 | Ito | .................................. | 701/41 |
| 5,852,330 A * | 12/1998 | Yumoto | ..................... | 290/40 R |
| 6,510,372 B1 * | 1/2003 | Zenzen | ................. | B60T 8/1766 180/197 |
| 7,957,880 B2 * | 6/2011 | Watabe et al. | .................. | 701/90 |
| 8,175,785 B2 * | 5/2012 | Turski et al. | ..................... | 701/82 |
| 2004/0059493 A1 * | 3/2004 | Nagura | ............. | B60K 23/0808 701/89 |
| 2004/0098188 A1 * | 5/2004 | Priemer | ................. | B60K 28/16 701/82 |

(Continued)

*Primary Examiner* — Truc M Do
(74) *Attorney, Agent, or Firm* — Fulwider Patton LLP

(57) ABSTRACT

A method for controlling wheel slip comprising determining an actual wheel slip of a set of driven wheels on a vehicle, adjusting the actual wheel slip for cornering distortion, setting a target slip condition using a traction control unit with a multi-position switch depending upon road conditions, calculating overslip of the wheels, and retarding an engine output to minimize overslip, and an apparatus for accomplishing same.

7 Claims, 7 Drawing Sheets

(56) References Cited

U.S. PATENT DOCUMENTS

| | | | | |
|---|---|---|---|---|
| 2004/0129491 | A1* | 7/2004 | Bean | B60B 35/003 180/411 |
| 2004/0195013 | A1* | 10/2004 | Spark | B60L 15/2036 180/6.24 |
| 2005/0103552 | A1* | 5/2005 | Ohno | B60K 23/0808 180/248 |
| 2005/0121976 | A1* | 6/2005 | O'Dea | B60T 8/1755 303/146 |
| 2005/0217906 | A1* | 10/2005 | Spark | B60T 8/24 180/22 |
| 2009/0112430 | A1* | 4/2009 | Showalter | B60K 17/046 701/69 |
| 2009/0112437 | A1* | 4/2009 | Luehrsen et al. | 701/84 |
| 2009/0127014 | A1* | 5/2009 | Ushiroda | B60K 28/165 180/249 |
| 2009/0228183 | A1* | 9/2009 | Watabe et al. | 701/90 |
| 2010/0161188 | A1* | 6/2010 | Turski et al. | 701/67 |
| 2011/0118948 | A1* | 5/2011 | Ohbayashi | B60T 8/172 701/70 |
| 2011/0160963 | A1* | 6/2011 | Yasui | B62D 11/003 701/41 |
| 2012/0116618 | A1* | 5/2012 | Tate | B60L 7/24 701/22 |
| 2014/0038763 | A1* | 2/2014 | Knickerbocker | B60K 23/08 475/221 |

\* cited by examiner

VEHICLE TRACTION CONTROL

BACKGROUND

The present invention relates generally to vehicle control systems, and more particularly to a traction control system that maximizes wheel traction and vehicle stability by limiting engine output based on driven versus undriven wheel speeds.

Traction control refers the process of controlling a vehicle's wheel rotation or spin under certain conditions. When a force is applied to a tire, it produces a frictional force from the interaction of the tire and road surface. Of interest is the longitudinal force on the driven wheels that is used to accelerate the vehicle, and the tire force from torque generated from the engine. A tire cannot produce a frictional force to accelerate the vehicle without any wheel torque, so the frictional force can be expressed as a ratio of the wheel torque to frictional force, often called the coefficient of friction.

Traction control has traditionally been a safety feature in premium high-performance cars, which otherwise need sensitive throttle input to prevent driven wheels from spinning when accelerating, especially in wet, icy or snowy conditions. In recent years, traction control systems have become widely available in non-performance cars, minivans, and light trucks. In race cars, traction control is used as a performance enhancement, allowing maximum traction under acceleration without wheel spin. When accelerating out of a turn, it keeps the tires at optimal slip ratio to maximize speed out of a turn. Traction control can also help a driver to corner more safely. If too much throttle is applied during cornering, the drive wheels will lose traction and slide sideways. This occurs as understeer in front wheel drive vehicles and oversteer in rear wheel drive vehicles. Traction control can prevent this from happening by limiting power to the wheels.

A driven tire has a slip ratio, which is the wheel speed divided by the actual speed of the vehicle. One can also measure the slip ratio as a percentage (e.g., a slip percentage of 10% means that the tire is moving 10% faster than the road surface). However, the slip ratio is not the same as wheel spin. When torque is applied to a tire, the tire distorts and the tire surface tends to 'creep' along the road without actually slipping, so a wheel can be moving faster than the road without any wheel spin. In practice, street tires give 1-3% wheel slip (without wheel spin) under moderate acceleration, and drag tires have much more wheel slip, depending on construction.

A tire's coefficient of friction depends on many factors, such as tire construction, road surface, tire loading, temperature, moisture, etc, but it generally increases with increasing wheel slip, up to a point, and then decreases. FIG. 1 illustrates a graph of coefficient of friction vs. wheel slip for a typical tire in dry conditions, with an optimum wheel slip of around 6-7%. In wet conditions, the optimum wheel slip tends is be much lower. For optimal acceleration, if one wishes to maximize the tire coefficient of friction, one needs to keep the wheel slip at the point of tire maximum coefficient of friction. The present invention is a system for accomplishing this objective.

There are various commercial systems that address the traction control in vehicles. Examples of traction control can be found at:
http://www.racelogic.co.uk/index.php/en/other-products/traction-control
http://www.motec.com.au/m800/m800overview/
http://www.aemelectronics.com/engine-management-systems-9/

However, each of these existing systems have a drawback in that a) they do not work as an aftermarket product that can operate with an existing engine computer, thus requiring a complete replacement of the existing engine computer at significant expense, or b) are not integrated into the engine computer control logic and so they cannot perform operations integral to the engine computer (for example, retarding ignition to reduce engine output).

The present invention overcomes the shortcomings of these existing systems and provides a robust and efficient traction control system that maximizes acceleration

SUMMARY OF THE INVENTION

The present invention is a traction control unit that can be incorporated into vehicles to limit slip and provide optimal traction for vehicles during various road conditions. The traction control unit is coupled to the engine's engine control unit (ECU), and provides input to the ECU to control the engine where over slip occurs. The traction control unit receives input from wheel sensors that measure the actual wheel speed, and from look-up tables that provide the optimal engine output for a given over slip value in pre-selected conditions such as wet or dry roads, curves or straight, roads, and the like.

DETAILED DESCRIPTION OF THE PREFERRED EMBODIMENTS

Figure 1:
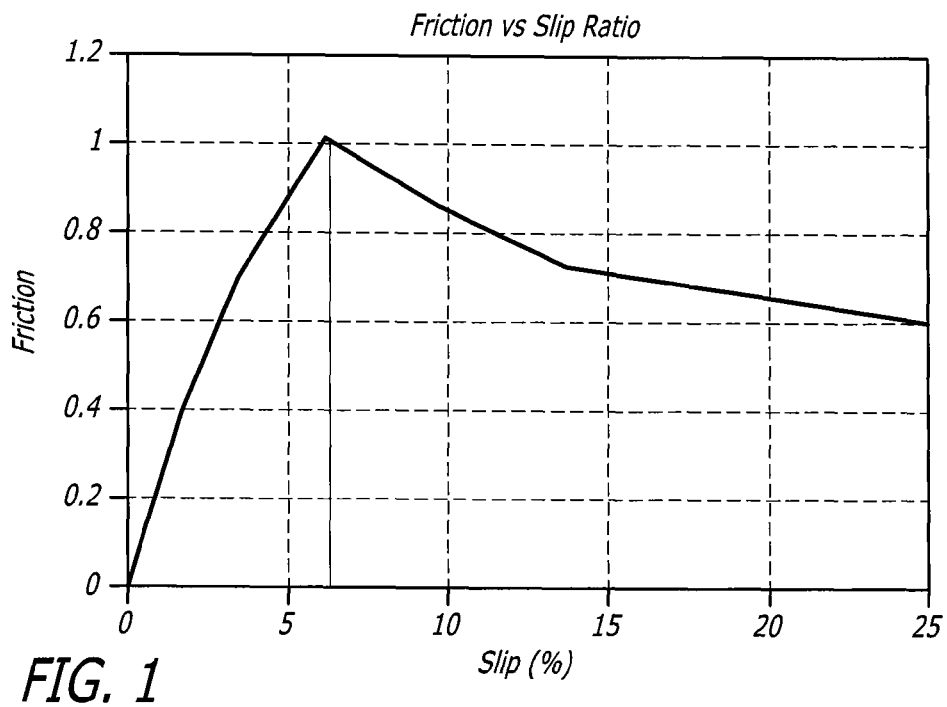
FIG. 1 is an exemplary graph of Friction as a function of Slip Percentage.

The present invention is a traction control unit and method of use that can be incorporated into a vehicle to control the engine output for the purpose of limiting over slip of the wheels. By controlling the engine output, the vehicle can operate more safely and higher performance can be achieved under a variety of conditions.

Wheel Slip

In order to optimize the traction control, it is necessary to obtain the real time wheel slip of the vehicle's tires during acceleration. Calculating the wheel slip involves the use of sensors on the driven and undriven wheels, where the difference between the speed of the driven wheels and the speed of the undriven wheels is the "wheel slip." A vehicle is provided with sensors on each axel at each wheel to measure the speed of the wheel and the speed of the axel. The difference between the speed of the wheel and the speed of the axel is the slip.

Cornering Compensation

When driving on a curved road, the wheels of the vehicle assume speeds based on the vehicle wheel base and the radius of the curve being driven upon. Generally, the front wheels track a larger arc than the rear wheels, and thus will turn faster. This situation gives a false slip rate between the front and rear wheels that can be compensated for using a chart such as that shown below for a given vehicle wheelbase and left/right speed differential.

|  | Left/Right Speed Differential (%) | | | | |
| --- | --- | --- | --- | --- | --- |
|  | 0 | 5 | 10 | 15 | 20 |
| Slip Compensation (%) | 0 | −0.37 | −1.43 | −3.15 | −5.55 |

Target Slip

The target slip is the ideal wheel slip that yields the maximum vehicle acceleration. Because this optimum value varies depending upon conditions (such as wet versus dry road), the target wheel slip must be variable. A traction control unit of the present invention includes a multi-position switch that allows the target slip to be set by the user, depending on the conditions, and the exact wheel slip settings for each switch position can be defined by the user.

Over Slip

Over slip is the difference between the target wheel slip and the actual wheel slip. In order to maximize acceleration, the system seeks to minimize over slip in the vehicle.

Ignition Retardation

To combat the effects of over slip, there must be some power reduction to slow the wheels down until the over slip is reduced. That is, when the wheel slip is greater than the target slip, the engine control unit must reduce the engine output so that the spinning wheels can adjust to the proper coefficient of friction. The engine control unit can achieve the reduction in power in various ways, such as changing the throttle plate and cutting spark, but the two most effective methods are retarding the ignition and selectively not firing the cylinders. The table below shows a sample ignition retardation percentage for a given over slip percentage.

|  | Ignition Retard (%) | | | | |
| --- | --- | --- | --- | --- | --- |
|  | 0 | 10 | 15 | 20 | 25 |
| Over slip (%) | 0.2 | 2.0 | 5.0 | 10.0 | 15.0 |

Cylinder Disable

An alternative method of reducing engine power is to selectively eliminate the activation of the cylinder firing. This is accomplished by removing all fuel and/or not firing the spark plug for a single cylinder event. The cylinder non-firing is rotated between cylinders in order to maintain the intake fuel wall deposits and cylinder temperature. A look-up table can be used to select the cylinder(s) for non-firing, using a table size that is not a multiple of the engine cylinder count to achieve the above cylinder rotation. Cylinder cut events are sequenced to avoid factors of the engine cylinder count (e.g., cutting one cylinder event in 3, 5, or 7 is preferable on a four cylinder engine). For additional power reduction, cutting two cylinder events in three or three cylinder events in five is preferable on a four cylinder engine. The table below illustrates a sample cylinder cut event for a four cylinder engine showing a progressively increasing power reduction.

| Cut | Event Number | | | | | | | |
| --- | --- | --- | --- | --- | --- | --- | --- | --- |
|  | 1 | 2 | 3 | 4 | 5 | 6 | 7 | 8 |
| 0% | | | | | | | | |
| 7% | | | | | | | X | |
| 13% | | | | | | | X | |
| 20% | | | | | X | | | |
| 27% | | | | X | | | | X |
| 33% | | | X | | | X | | |
| 40% | | | X | | X | | | X |
| 60% | | X | X | | X | | X | X |
| 66% | | X | X | | X | X | | X |
| 80% | | X | X | X | X | | X | X |
| 100% | X | X | X | X | X | X | X | X |

| Cut | Event Number | | | | | | |
| --- | --- | --- | --- | --- | --- | --- | --- |
|  | 9 | 10 | 11 | 12 | 13 | 14 | 15 |
| 0% | | | | | | | |
| 7% | | | | | | | |
| 13% | | | | | X | | |
| 20% | | X | | | | | X |
| 27% | | | | X | | | X |
| 33% | X | | | X | | | X |
| 40% | | X | | | X | | X |
| 60% | | X | | X | X | | X |
| 66% | X | | X | X | | X | X |
| 80% | X | X | | X | X | X | X |
| 100% | X | X | X | X | X | X | X |

Figure 2:
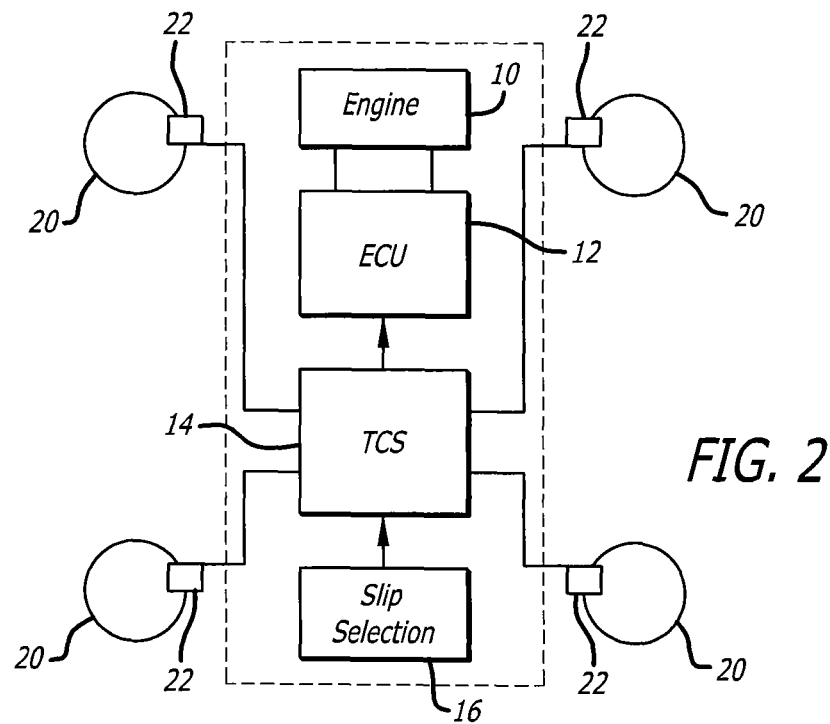
FIG. 2 is a schematic of the traction control unit as part of a vehicle control system.

FIG. 2 illustrates an overall vehicle wheel control system having an engine 10, an engine control unit 12, a traction control system 14, and a slip selection switch 16. Each of the wheels 20 are coupled to sensors 22 that measure the wheel speed and relay the speed to the traction control system 14. The traction control system interprets the signals from the sensors 22 and the slip selection switch position 16 (which may be manually adjusted or computer controlled), and determines a target slip. The traction control unit 14 then sends a command to the engine control unit 12 to reduce the engine output according to a predetermined value for the respective target slip. The engine control unit 12 then sends a signal to the engine 10 to reduce output, either by spark retardation or by cylinder non-firing.

Figure 3:
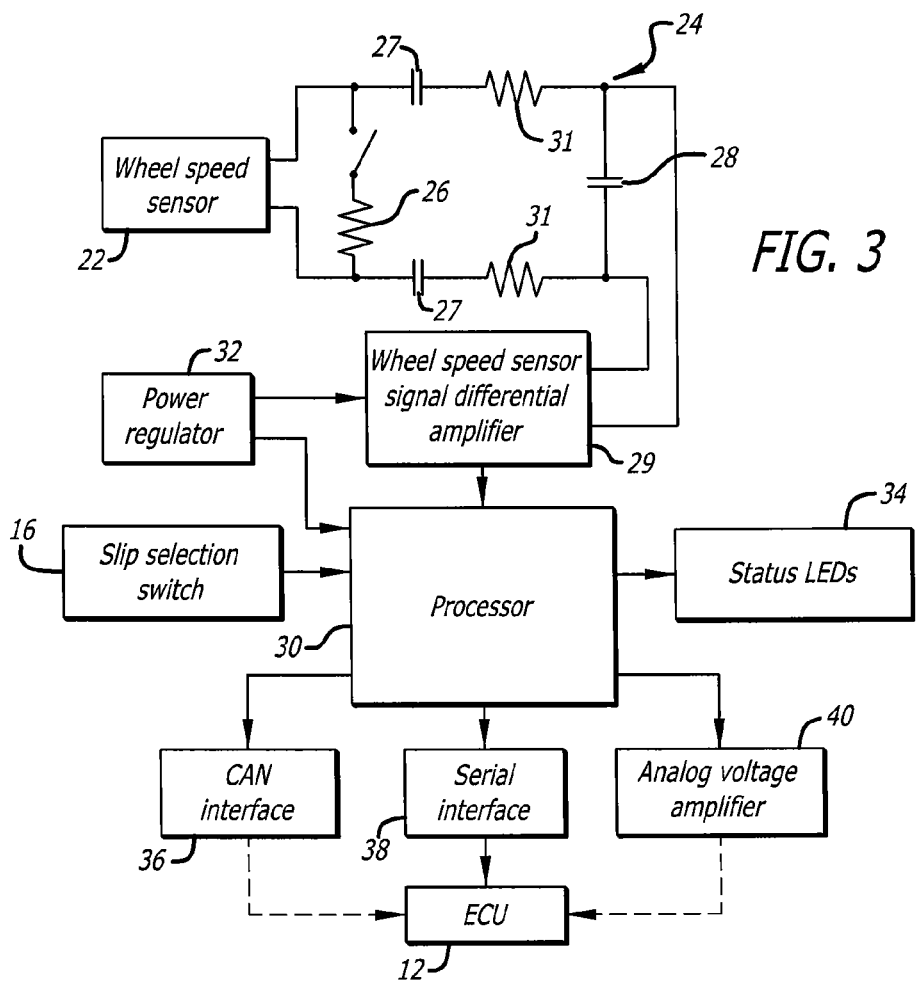
FIG. 3 is a schematic of a traction control unit.

FIG. 3 illustrates the elements of a traction control system 14 from FIG. 2. Each wheel speed sensor 22 is coupled to an electrical circuit 24 via a decoupling capacitor 27 to allow for speed sensor bias voltage from existing ABS units, and a current limiting resistor 31. A switchable shunt resistor 26 allows constant current ('active') ABS sensors to be used. A capacitor 28 in parallel reduces spurious noise in the circuit. The circuit 24 is connected to a wheel speed sensor signal differential amplifier 29 that amplifies the sensor signal, and outputs the amplified signal to a processor 30. The differential amplifier section 29 may be a MAX9926 device or similar Maximum Integrated Products, with adaptive thresholds to accurately measure wheel speed signals over a wide range of input voltages and frequencies. A power regulator 32 provides power to both the amplifier 29 and the processor 30. The slip selection switch 16 has multiple positions that can be read by the processor 30, which illuminates status LEDs 34 as a visual indicator to the user of the status of the unit 14. LEDs are illuminated for each measured wheel speed pulse input, power on, and error conditions.

The processor 30 is also tasked with providing three inputs to the engine control unit 12: a CAN interface 36; a Serial interface 38; and an analog voltage amplifier 40. The analog voltage amplifier 40 provides an analog output voltage with an output voltage proportional to the calculated wheel overslip, which can be utilized by an existing engine computer to reduce engine power. The serial interface 38 and CAN interface 36 outputs both measured and calculated values from the processor in a serial format for utilization of the engine computer for power reduction and also for datalogging, testing, and diagnosis. An additional output is four digital pulse outputs for each wheel, that can be used by additional electronic recording/datalogging devices to record wheel speeds using the filtered digital signal. The output signals may also be divided to prevent the output pulse rate exceeding the maximum input frequency of the recording device.

Figure 4:
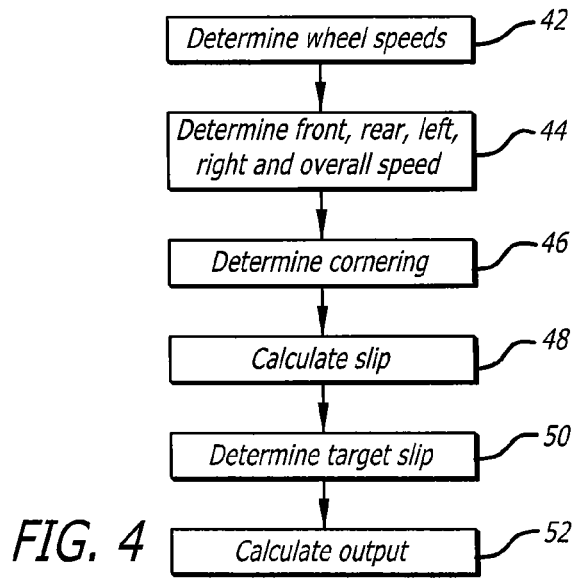
FIG. 4 is a flow chart for the operation of the traction control unit.

FIG. 4 is a flowchart that illustrates a sample logic to control the slip in a vehicle, and the operation of the traction control unit 14. In step 42, the wheel speeds are measured using the sensors 22, and in step 44 the overall speed is calculated. If the vehicle is traveling around a corner, step 46 determines the characteristics of the cornering so that the front/back differential can be determined. From these input, step 48 calculates the actual slip, and a target slip is determined in step 50. With the target slip and actual slip, the traction control system determines an engine output in step 52 that corresponds to the specific over slip, and forwards the engine output to the engine control unit 12 for engine output reduction to obtain the target slip.

Figure 5:
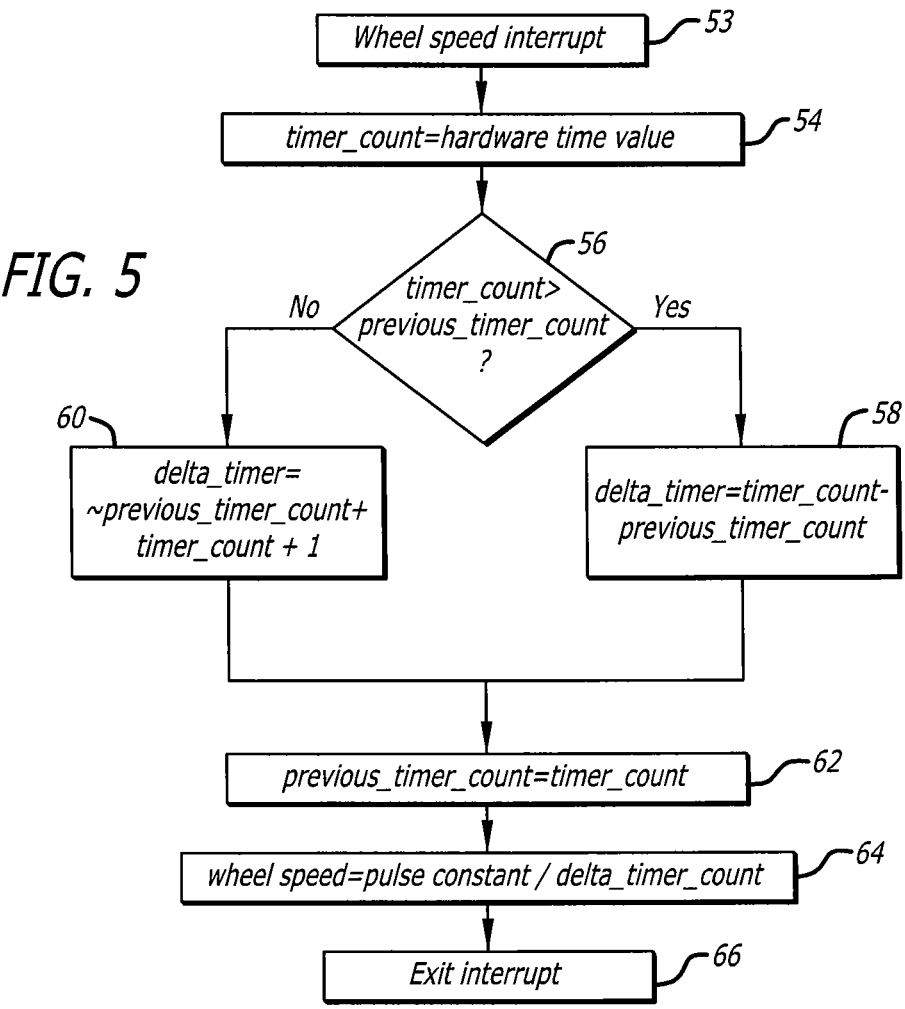
FIG. 5 is a flow chart for the determination of the wheel speed.

FIG. 5 is a logic flowchart that is used to determine the wheel speed. A hardware timer is set to a frequency and width to provide sufficient timer resolution at high vehicle speeds and also a sufficient timer between timer counter overflows for a low minimum recorded speed. Step 53 corresponds to a wheel speed interrupt to begin the counter. Step 54 sets the timer count to the hardware timer value. Decision 56 checks to see if the timer count is greater than the previous timer count. If yes, the logic records the delta timer value in step 58 as the difference between the previous timer count and the current timer count. If no, the timer has overflowed and the delta timer value is calculated in step 60 as the current timer count added to the 2s complement of the previous timer count plus one. The previous timer count is then set to the present timer count in step 62, and the wheel speed is calculated to be the pulse constant divided by the delta timer count in step 64. That is, the sensor pulse constant divided by the interval gives the wheel speed. The program then exits in step 66. The data can be smoothed by triggering the interrupt every n pulses (normally n=1, higher values give more smoothing). The pulse constant depends on the number of wheel sensor pulses per distance and the hardware timer frequency.

To determine the front, rear, left, right, and overall speed of the wheels, the following determinations can be established.
   front_speed=average, minimum or maximum of left front & right front wheel speeds.
   rear_speed=average, minimum or maximum of left front & right rear wheel speeds
   overall_speed=average, front or rear axle speeds
   left_speed=average, front or rear wheel speeds
   right_speed=average, front or rear wheel speeds
   Normal settings:
   front_speed & rear_speed uses the average speed of the left & right wheels on that axle.
   overall_speed uses the speed of the undriven axle.
   Left & right speeds use the undriven axle speeds.

Figure 6:
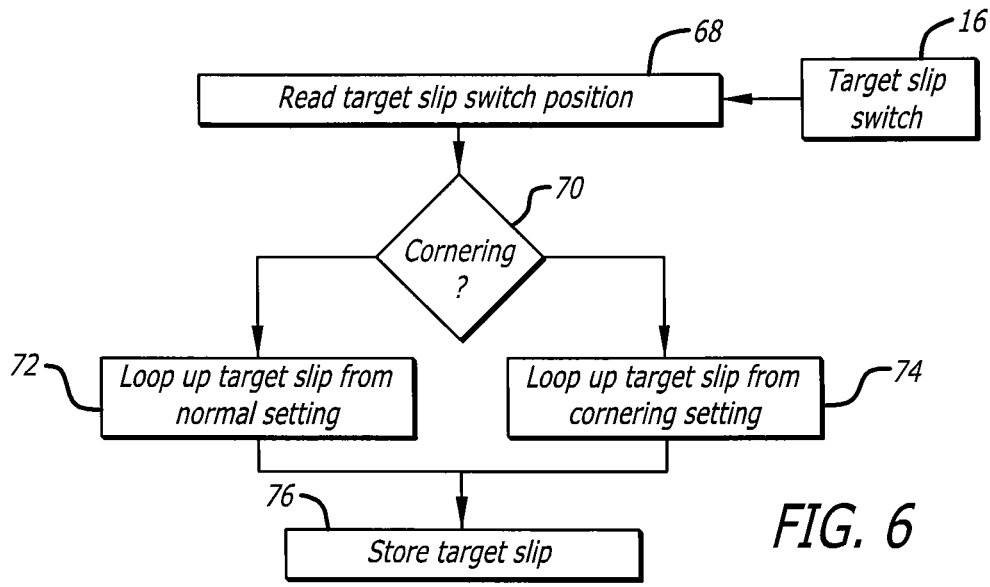
FIG. 6 is a flow chart for the determination of the target slip value.

To determine the cornering effect:
   turning_slip=the absolute ratio between right_speed and left_speed
   turning_difference=absolute difference between right_speed and left_speed
   if(turning_difference<min_speed_difference)
      cornering_counter=0
   else
      increase cornering_counter
   if(cornering_counter>min_cornering_time)
      cornering=1
   else
      cornering=0
   min_speed_difference is the minimum left/right speed difference before the vehicle is considered to be cornering.
   min_cornering_time is the minimum time for the left/right speed difference to be above the threshold before the vehicle is considered to be cornering. To determine the actual slip:
   To Calculate Slip:
   if driven wheel are the front wheels
      if overall_speed<minimum_activation_speed or speed_rear=0
         drive_slip=0
      else
         drive_slip=speed_front/speed_rear
         speed_difference=speed_front−speed_rear
   if driven wheel are the rear wheels
      if overall_speed<minimum_activation_speed or speed_front=0
         drive_slip=0
      else
         drive_slip=speed_rear/speed_front
         speed_difference=speed_rear−speed_front
   cornering_slip_adjustment=lookup slip compensation table based on turning_slip
   adjusted_slip=drive_slip+cornering_slip_adjustment FIG. 6 illustrates a flow chart to determine the target slip. In step 68 the target slip switch position is read from the target switch 16, and depending on whether there is cornering in decision 70, the target slip is looked up in either a normal setting in step 72 or from the cornering setting in step 74. This table value is then stored in step 76.

To determine over slip, if the adjusted slip value is less than the target slip value, then there is no over slip and the value is assigned zero. If the adjusted slip value is greater than the target slip value, then the over slip is simply difference between the adjusted slip and the target slip.

Figure 7:
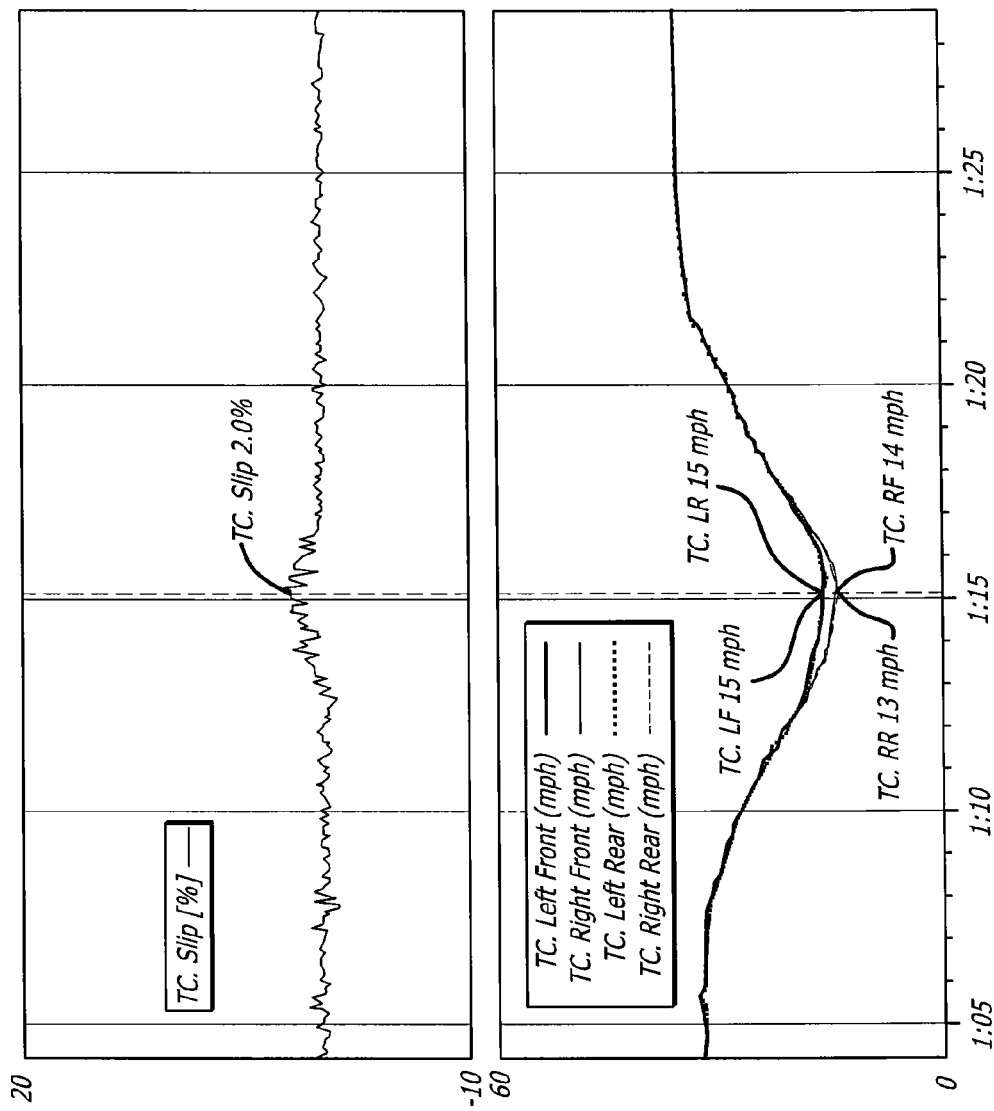
FIG. 7 is a graph showing the wheel speed while turning without turning slip compensation.
Figure 8:
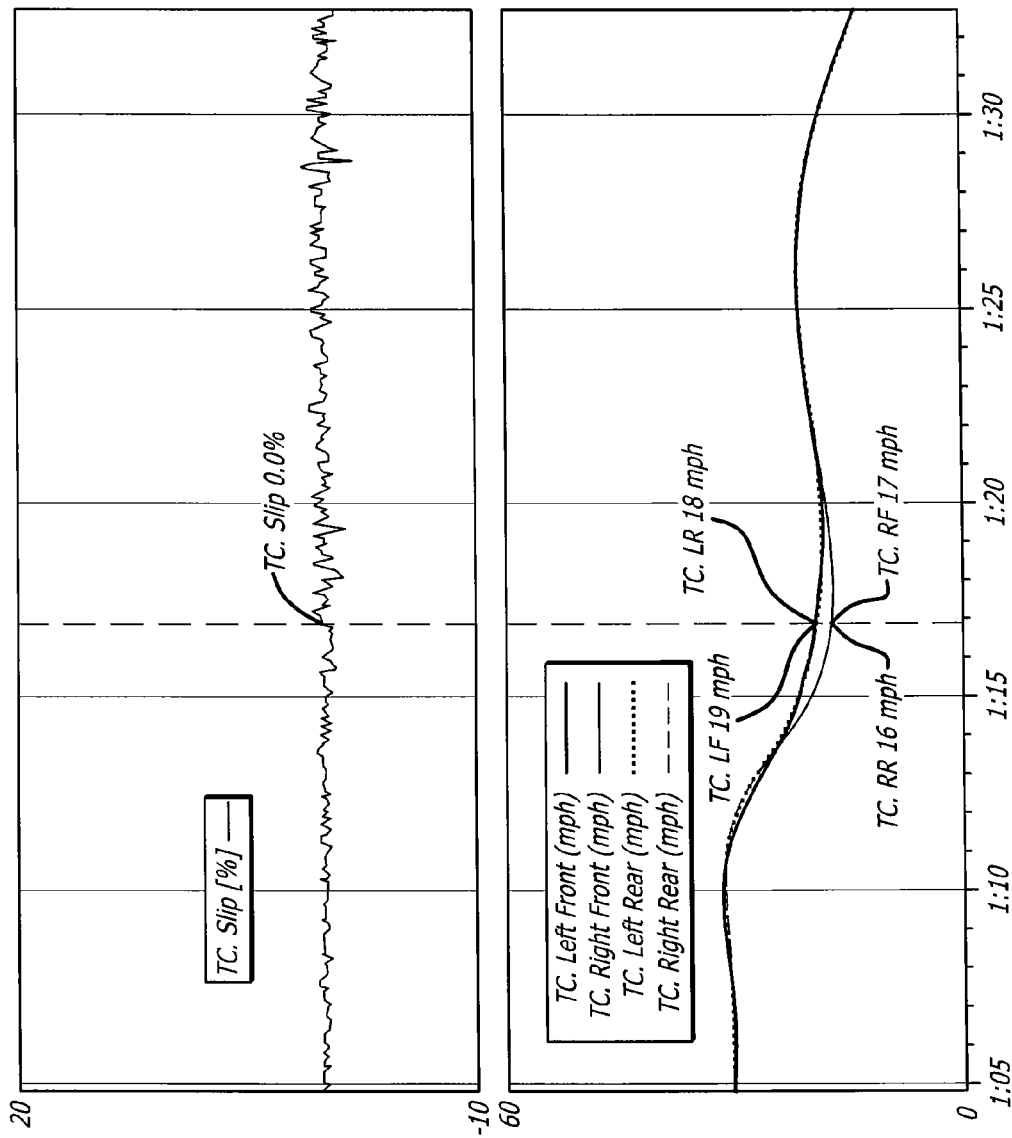
FIG. 8 is a graph showing the wheel speed while turning with turning slip compensation.
Figure 9:
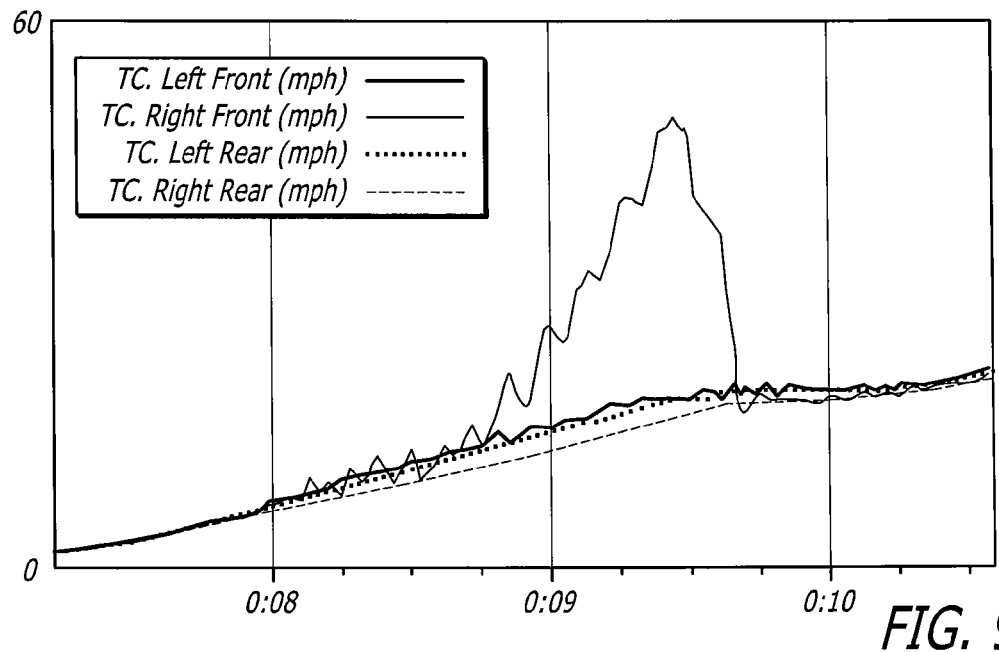
FIG. 9 is a graph showing the wheel speed, no turning, without traction control.
Figure 10:
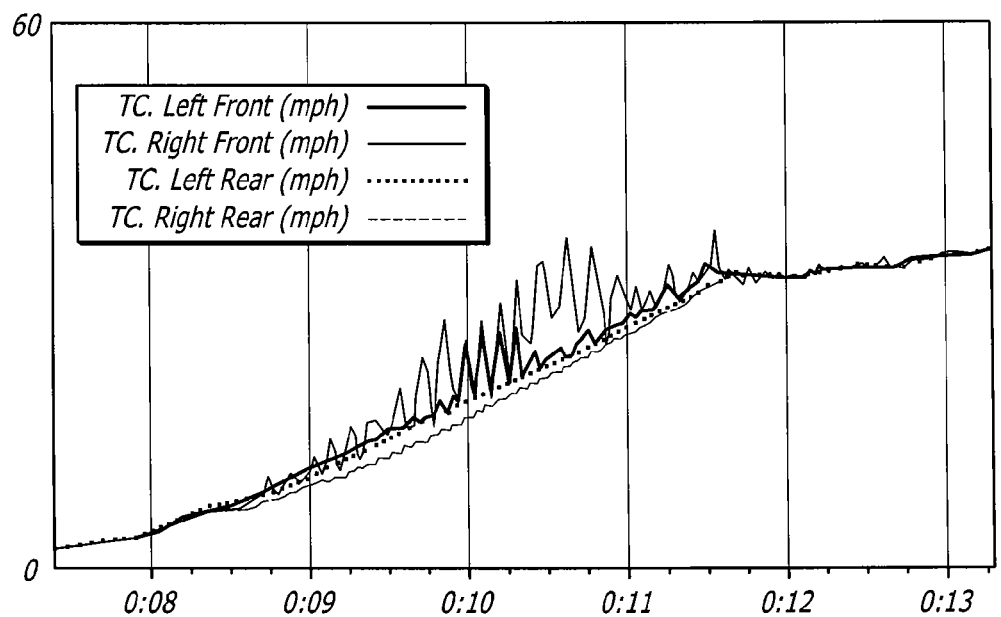
FIG. 10 is a graph showing the wheel speed, no turning, with traction control.
Figure 11:
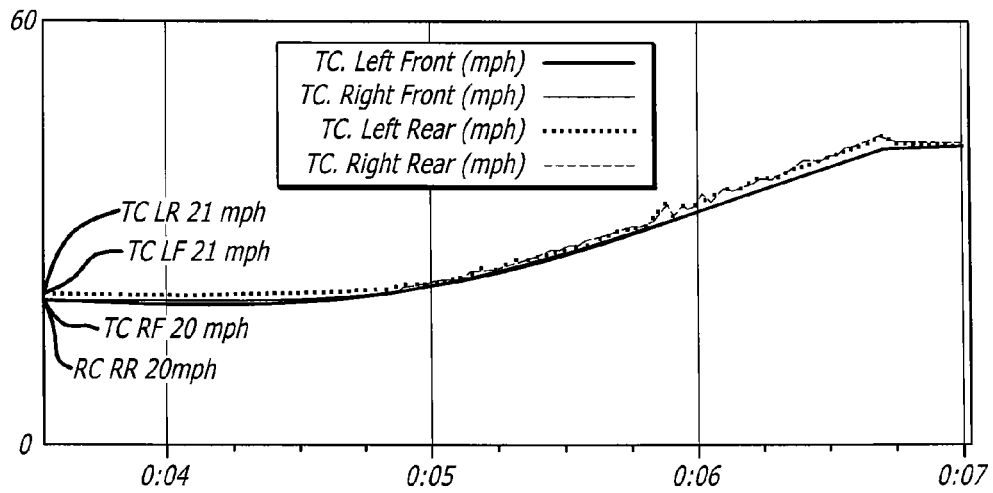
FIG. 11 is a graph showing the wheel speed for a low target slip condition with traction control.
Figure 12:
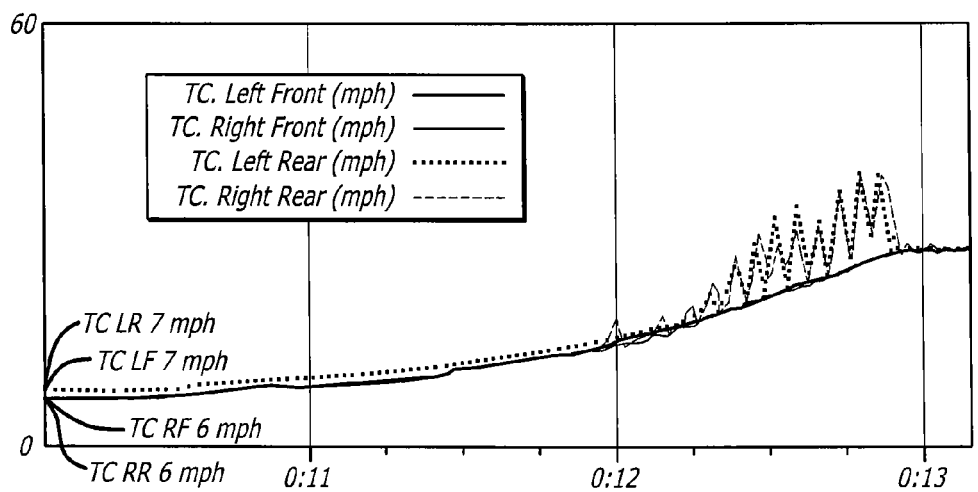
FIG. 12 is a graph showing the wheel speed for a high target slip condition with traction control.

To calculate the engine output, the following sequence can be used:
kp, ki, kd=PID terms
pid_p=over_slip
p_total=pid_p*kp
if over_slip=0
   pid_i=0
else
   pid_i=pid_i+pid_p
i_total=pid_i*ki
d_factor=moving average calculation constant
sum_d=((d_factor31 1)*sum_d+value)/d_factor
pid_d=sum_d−pid_p
d_total=pid_d*kd
pid_total=p_total+i_total+d_total
voltage_output=voltage_offset+pid_total*voltage_scalar
serial & CAN outputs use pid_total and other calculation variables The foregoing system has been tested and shown to provide excellent results in maximizing acceleration. FIG. 7 illustrates the results of the traction control while turning without turning slip compensation, and FIG. 8 shows the same result with turning slip compensation. FIG. 9 illustrates the wheel speeds without traction control, and FIG. 10 shows the wheel speed with traction control. FIG. 10 illustrates the wheels tending toward the target slip rate with the traction control engaged. Finally, FIG. 11 shows wheel speeds for a low target slip (1%), and FIG. 12 shows wheel speeds with a high (6%) target slip.

I claim:

1. A vehicle control system comprising:
an engine;
an engine control unit;
a traction control system including a processor;
a slip selection switch;
a plurality of wheels, where some wheels are driven and some wheels are not driven; and wheel sensors;
wherein the vehicle wheel control system interprets signals from the wheel sensors and the slip selection switch, and determines a target slip;
and the vehicle wheel control system then sends a command to the engine control unit to reduce the engine output according to a predetermined value for the target slip; and
wherein the processor further outputs four digital pulse outputs for each wheel that is used for electronic recording and datalogging; and
wherein the output signal is divided to prevent an output pulse rate from exceeding a maximum input frequency of a reading device.

2. The vehicle wheel control system of claim 1, wherein the slip selection switch is manually adjusted.

3. The vehicle wheel control system of claim 1, wherein the slip selection switch is computer controlled.

4. The vehicle wheel control system of claim 1, wherein the engine control unit reduces the engine output by omitting an engine cylinder sparking event.

5. The vehicle wheel control system of claim 4 wherein the omitting an engine cylinder sparking event is sequenced to avoid factors of an engine cylinder count.

6. The vehicle wheel control system of claim 1, wherein the traction control system includes a processor, and the processor provides three inputs to the engine control unit: (a) a CAN interface; (b) a serial interface; and (c) an analog voltage amplifier.

7. The vehicle wheel control system of claim 6 wherein the analog voltage amplifier provides an analog output voltage proportional to a calculated wheel over slip.

* * * * *